US011972701B1

(12) United States Patent
Reyes, Sr.

(10) Patent No.: US 11,972,701 B1
(45) Date of Patent: Apr. 30, 2024

(54) ARTICULATING SIGN COVER CLAMP

(71) Applicant: Glenn Errol Reyes, Sr., Lauderhill, FL (US)

(72) Inventor: Glenn Errol Reyes, Sr., Lauderhill, FL (US)

( * ) Notice: Subject to any disclaimer, the term of this patent is extended or adjusted under 35 U.S.C. 154(b) by 20 days.

(21) Appl. No.: 18/342,356

(22) Filed: Jun. 27, 2023

(51) Int. Cl.
*G09F 7/20* (2006.01)
*G09F 7/18* (2006.01)

(52) U.S. Cl.
CPC ........ *G09F 7/20* (2013.01); *G09F 2007/1813* (2013.01)

(58) Field of Classification Search
CPC ............................ G09F 7/20; G09F 2007/1813
See application file for complete search history.

(56) References Cited

U.S. PATENT DOCUMENTS 4,372,071 A * 2/1983 Vicino ................ G09F 15/0025 40/624
4,754,566 A * 7/1988 Gordon ............... G09F 15/0018 40/624
4,834,331 A * 5/1989 Domingo .................. G09F 7/20 248/329
4,922,988 A * 5/1990 Loomis ............... G09F 15/0025 160/368.1
2005/0262743 A1* 12/2005 Siegenthaler ............. G09F 7/18 40/603
2007/0056200 A1* 3/2007 Ridless ................... G09F 17/00 40/603
2010/0199535 A1* 8/2010 Reynolds ................ G09F 15/00 40/624
2017/0236460 A1* 8/2017 Cook .................. G09F 15/0025 40/603

* cited by examiner

*Primary Examiner* — Gary C Hoge

(57) ABSTRACT

A portable clamping device that improves the Prior Art of safely securing materials covering the face of a mounted sign to hide advertised information. It relates primarily to traffic control operations in the Transportation Engineering industry, especially during road construction and maintenance operations. It includes two expandable hooks that straddle the edge of a sign, and one flat bar placed over the material on the front surface, such that when the hooks are clamped to the rear surface of the sign, the bar reacts by gripping the front. Hooks can swivel and slide along the full length of the bar, which allows the device to articulate around the corners and edges of planar signs of any shape. Hook operations may be manual or electronic. The device is safe and easy to use, non-destructive to signs, resistant to the elements, and cost effective.

7 Claims, 9 Drawing Sheets

ARTICULATING SIGN COVER CLAMP

CROSS-REFERENCE TO RELATED APPLICATIONS

This patent claims the benefit of provisional patent application 63/371,126 filed 2022 Sep. 9 by this applicant inventor.

PRIOR ART

| Pat. No. | issue date | Patentee |
|---|---|---|
| | U.S. Patents | |
| U.S. Pat. No. 6,209,598 B1 | Apr. 3, 2001 | Todd H Petrey, Florida, USA |
| U.S. Pat. No. 10,395,567 B2 | Aug. 27, 2019 | Michael R. Harter, MS, USA |
| U.S. Pat. No. 20,160,297,188 A1 | Apr. 13, 2015 | Roger D. Melancon Jr., IN, USA |
| | Foreign Patent | |
| AU 2007231913 B1 | Nov. 02, 2007 | West, Gary Roy |

BACKGROUND OF THE INVENTION

The challenge of securing a flexible material covering the front surface of a sign or billboard has existed for decades. This challenge is experienced on a daily basis throughout the industrialized countries of the world, particularly during highway and roadway construction. Many attempts have been made to resolve this challenge over the years, but most have been deemed too cumbersome, too labor intensive, too ineffective or too expensive.

Many methods to solve this challenge of covering a sign temporarily or permanently have been attempted in the Prior Art. Solution proponents generally acknowledge the common need for the coverings, discuss the problems associated with the various covering methods and apparatus, and suggest the desired features of a good solution. The following examples are taken from issued patents:

In the above referenced Patent #: U.S. Pat. No. 6,209,598 B1 the Inventor acknowledges the need for a sign cover during road construction operations, and also admits in paragraph 20 that most of the cover schemes are destructive to the signs.

Mr. Petrey's invention introduces a method using a full fabric cover secured with straps that are tied at the back of the sign. This method, although practical, is labor-intensive, inefficient and unsafe because a cover is only as secure as the straps tying it in place. This method requires that a number of pre-made fabric covers be made for road signs of many different shapes and sizes.

In the other referenced Patent #: U.S. Pat. No. 10,395,567 B2, the Inventor, as in the previous example, tackles the sign covering challenge by suggesting an overlaying, sliding planar member with side features to hold a temporary sign over an existing one. This method is both cumbersome and labor intensive for use during daily maintenance of traffic operations.

Thirdly, in Patent Application #: AU 2007231913 B1 the Inventor describes the common informal method of using flexible materials for covers that are stitched, taped or tied at the back of a sign. Some of the associated problems he describes include covers as unsightly, unsafe, and prone to being loosened and flapping or even being detached and becoming airborne missiles.

He proposes several embodiments of a sign cover with fixed-shaped panels of flexible material, of various colors, including a sock-like embodiment with means to tie two panels together to fit the shape of an existing sign. Again, this method is cumbersome, expensive and requires many different pre-made panels of different shapes and sizes that must be installed individually on each sign as needed.

The above references provide a glimpse into some of the attempts to solve the problem of adequately and efficiently covering road signs in the Transportation Engineering and the road traffic control industry.

A general discussion by Inventor Roger D. Melancon Jr. of Indianapolis, IN, USA, in the Document ID US 20160297188 A1, published Oct. 13, 2016 summarizes the challenge in paragraphs 0005 through 0007 of the Background section as follows: "instead of an adhesive, one or more fasteners may be disposed through the covering and the sign in order to hold the covering in place. This may result in firmer securement, but that occurs at the expense of having to put holes in the sign, thereby damaging the sign. Thus, while these methods may be effective at concealing the desired signage, concealment may come with increased cost or at the expense of damaging the underlying sign."

The embodiments of the ASCC as disclosed in this application addresses some of the issues discussed above and attempts to contribute an alternative solution.

SUMMARY OF THE INVENTION

The articulating sign cover clamp (ASCC) is a portable, articulating, clamping device used on mounted road signs or billboards (herein all categorized as "signs") to secure coverings of suitable materials, mostly flexible, in order to temporarily conceal traffic or advertising information from public view, particularly during road construction or maintenance operations, or whenever such advertised information is to be concealed from view.

The ASCC provides an alternative to solutions already published in the Prior Art, by the following disclosure, which includes the qualities of being non-destructive to signs, economical in cost, safe and secure for traffic control use, and easily installed.

In this disclosed embodiment, the ASCC is comprised of two basic metal members: a flat gripping bar (bar), and a variable-width hook (hook), of which there are two per unit.

The bar further comprises a metal guide (guide) that contains an open channel with end stops, such that the guide and the bar constitute an integral unit. The guide also contains three tie-down holes capable of receiving the hooked ends of cargo straps or tie-down cords.

The guide and the bar may be manufactured as one part.

Optionally, the interior surface and the top and bottom edges of the bar may be covered by a protective, replaceable Silicone rubber C-channel sleeve.

The hook is comprised of two L-shaped sections of metal angles, MA1 and MA2, where each has a short leg and a long leg. The two short legs overlap to form the base of an inverted U-shaped member.

The base of the hook is slidably fitted with a carriage bolt, torque washer, flanged wing nut (wing nut), lock washer and an end stop (jam nut 1).

MA2 further contains a rivet pin (rivet) in its long leg (FL), which is comprised of a factory head (FH), a shank and a shop head (SH) and a metal washer (roller).

MA1 further contains an eyebolt (EB), lock nut (LN), T-nut and stop nut (jam nut 2) in its long leg (RL); the EB is fitted into a circular metal washer (metal disc) and a polymer disc pad (pad) fastened to it, and enters the RL through a control nut (boss nut) welded to RL.

Method of operation of the ASCC:

Turning the EB clockwise will tighten the metal disc and clamp the pad on to the rear surface of a sign, reactively causing the bar to grip the front surface. A counterclockwise turn of the EB will reverse the clamping action.

The width of the base may be adjusted by regulating the position of the two overlapping surfaces relative to each other, thus providing a variation in the width dimension of the hook to fit signs of various dimensions.

Tightening the wing nut and lock washer will lock or unlock the width position.

Although a standard unit of the ASCC in this embodiment requires a minimum of two hooks and one bar, a single hook and a bar may also be used successfully, depending on the conditions of use.

The fixed guide on the bar allows a pair of hooks, that are connected to it by rivets, to swivel and slide freely along its full length.

The ability of the hooks to swivel and slide allows the ASCC to articulate its member segments around the perimeter of a sign of any planar geometry.

Tie-down straps may be used to further secure flexible covers by attaching their hooked ends to the holes provided in the guide.

An optional Silicon rubber C-channel sleeve may be placed on the interior surface and edges of the bar to further protect the sign surface.

Some advantages of the ASCC in this embodiment or in any of its other aspects or embodiments include:

a) easy to install (portable, lightweight, easy to operate, quickly replaceable).
b) non-destructive (does not mar the underlying sign surface nor damage the material cover).
c) resistance to the elements (made of galvanized metal, aluminum, plastic, polymer resin, or other non-corrosive materials).
d) economical (inexpensive and requiring fewer units to adequately secure cover materials).
e) strong clamping force, not to exceed FHWA guidelines (holds fast during strong winds and storms).
f) safe (protecting motorists by preventing covering materials from loosening and detaching, misguiding or confusing traffic or becoming missiles; each unit is to be tied to the rear of the sign structure while in use for safety redundancy).
g) may be painted and color coded (providing identification and improve maintenance of traffic operations).
h) controls may be made electronic (to facilitate remote/tele operations).
i) aesthetic (provides clean, pleasant appearance to the public and motorists in traffic).

DETAILED DESCRIPTION OF THE INVENTION

Figure 1:
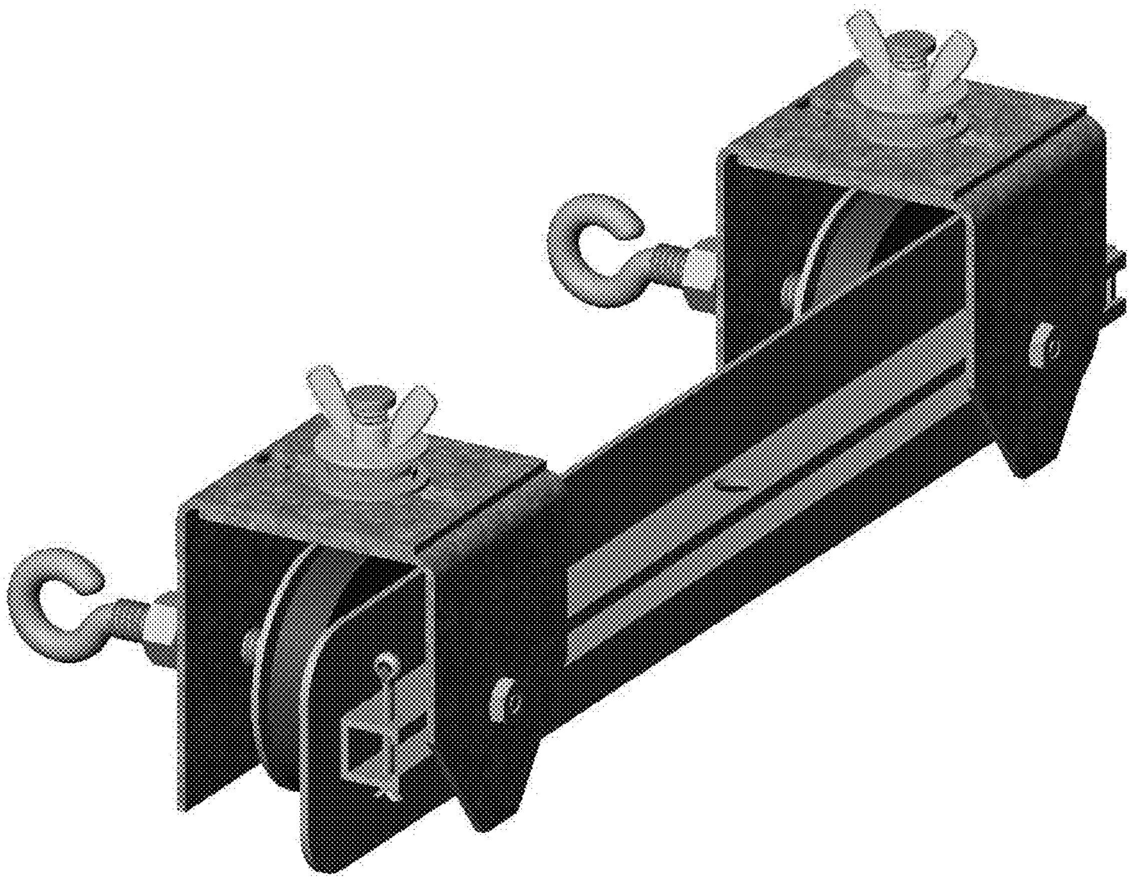
FIG. 1: Perspective Model View.
Figure 1A:
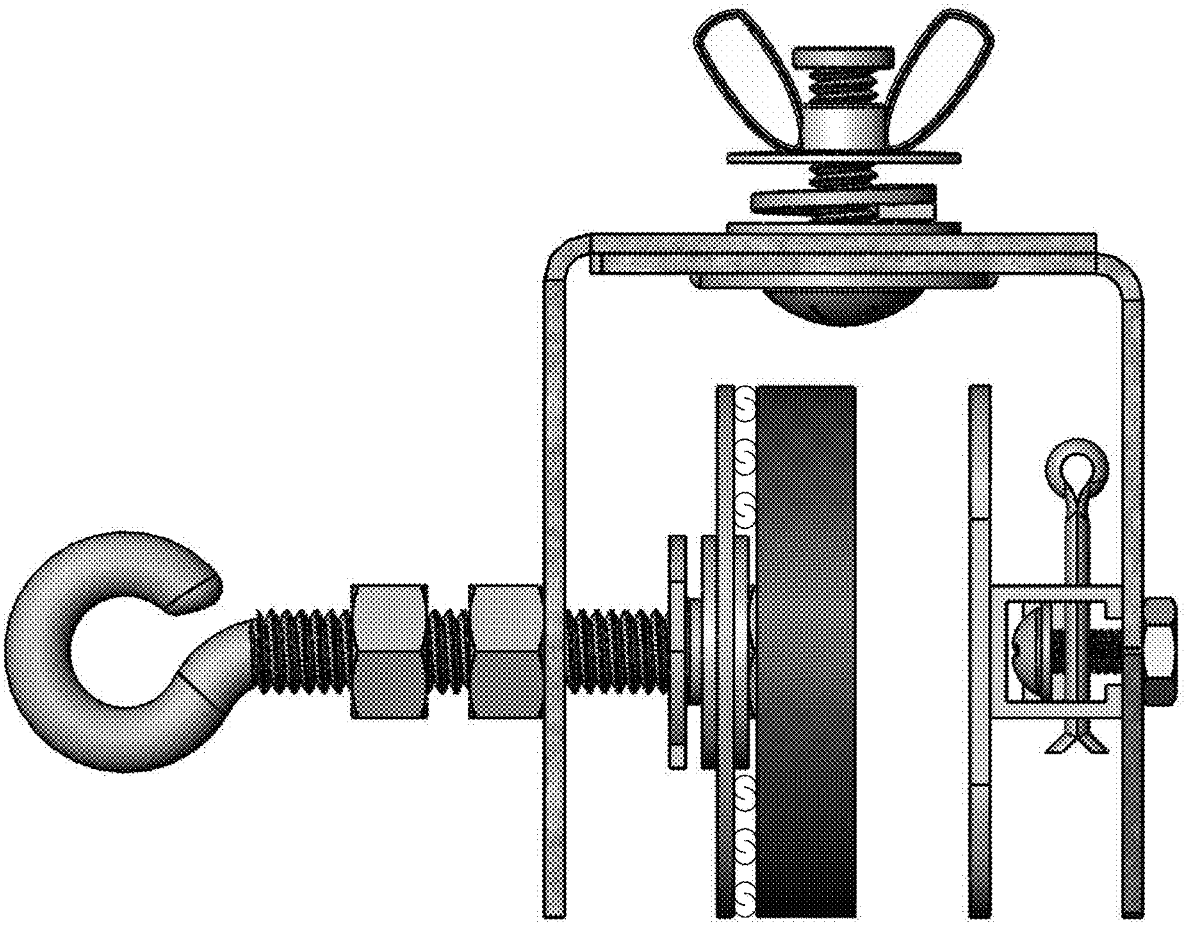
FIG. 1A: Model End View of the (mechanical) embodiment of the ASCC.
Figure 1B:
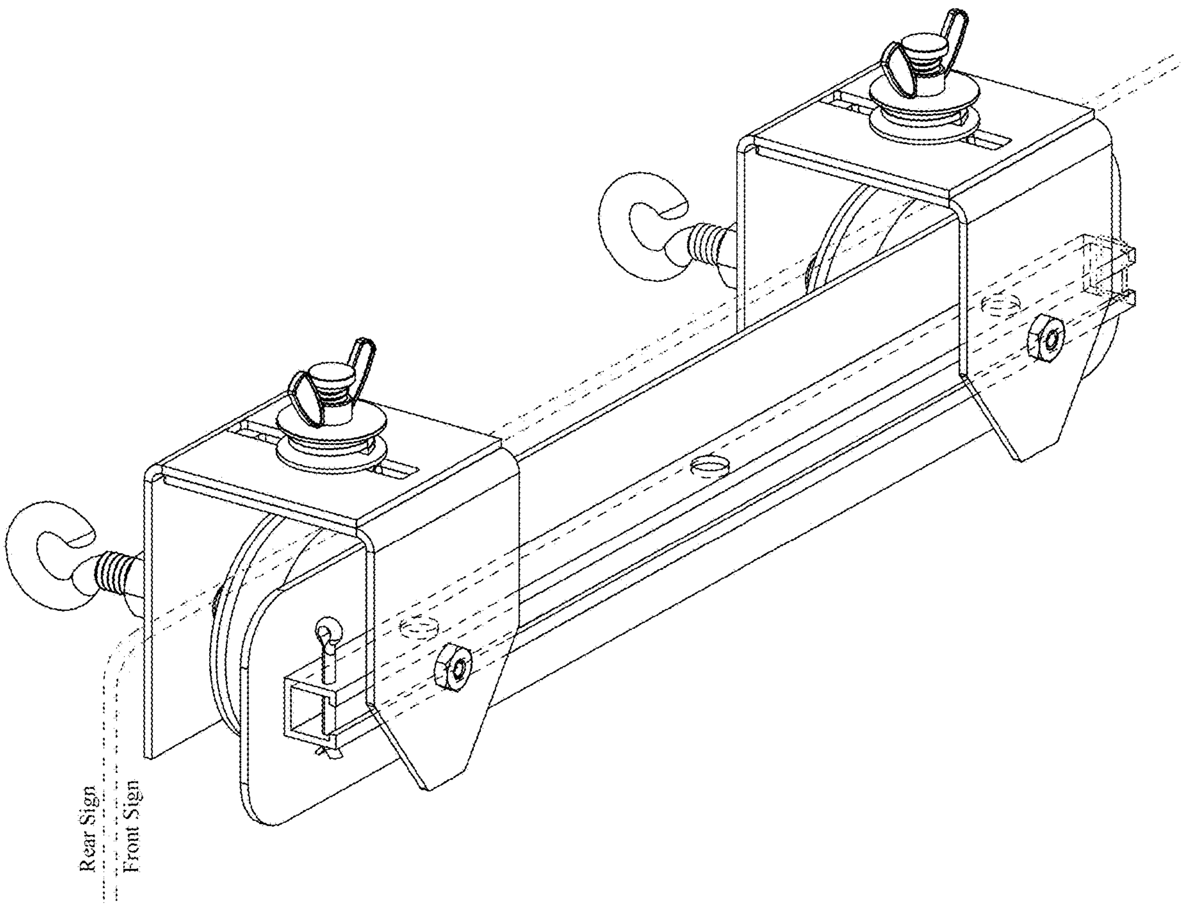
FIG. 1B: Perspective Drawing of the (mechanical) embodiment of the ASCC.

The articulating sign cover clamp (ASCC) is a portable, articulating, clamping device used on mounted road signs to secure various coverings of suitable materials, mostly flexible, in order to temporarily conceal traffic or advertising information from public view, particularly during road construction or maintenance operations, or whenever such advertised information is to be concealed from public view.

A list of the Reference Numbers may be found in the Drawings section.

Figure 1C:
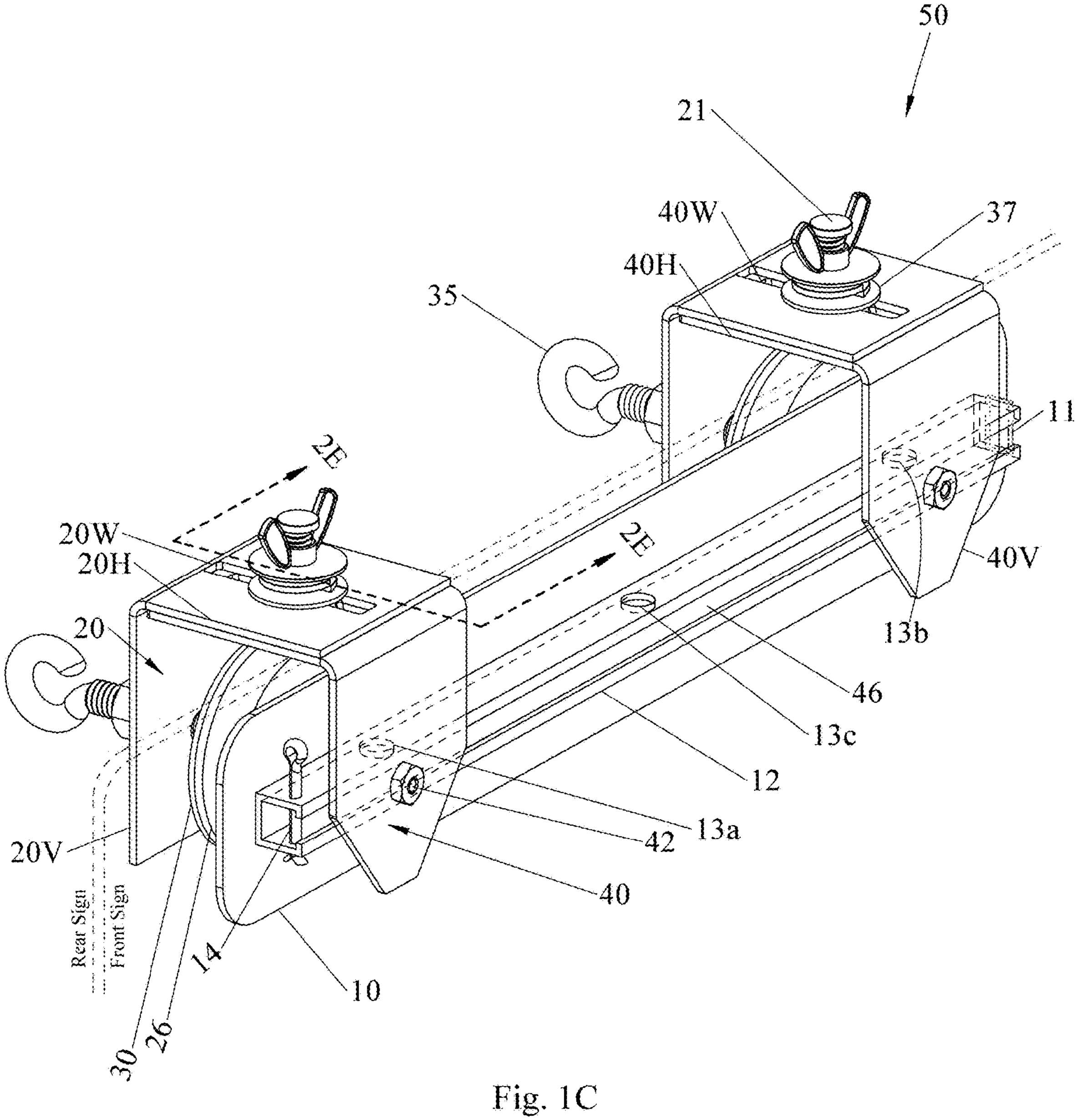
FIG. 1C: Perspective Drawing showing Reference Numbers of parts of the (mechanical) embodiment of the ASCC.

This device, whose embodiment is shown as a model image in FIG. 1 comprises the assembly of two inverted U-shaped, variable-width hooks [50] attached to a bar [10], as shown in FIG. 1C. Each of the hooks [50] that can swivel in place along the bar [10] between 0 to 40 degrees right and left of vertical about the Z axis, and rotate between 0 to 270 degrees at the very ends, can also slide along the full length of the bar [10] in the X axis orientation.

Spatial Orientation defined:

XYZ Axes: the two parallel sides of a "U" are defined as aligning with the Y axis; the bottom of the "U", the Z axis, and the X axis as being perpendicular to the Y-Z plane.

Interior and Exterior defined:

Interior surfaces and spaces face inwards toward the front or rear surfaces of a sign on which a hook [50] is installed.

Exterior surfaces and spaces face outwards away from the front or rear surfaces of a sign.

Dimensions presented are reasonable measurements identified for this embodiment as disclosed, and are shown in metric and USCS (mm/ins) units. They are not intended to be definitive or precise, but as a practical guide for the manufacturing of such devices by someone skilled in the art.

Figure 1D:
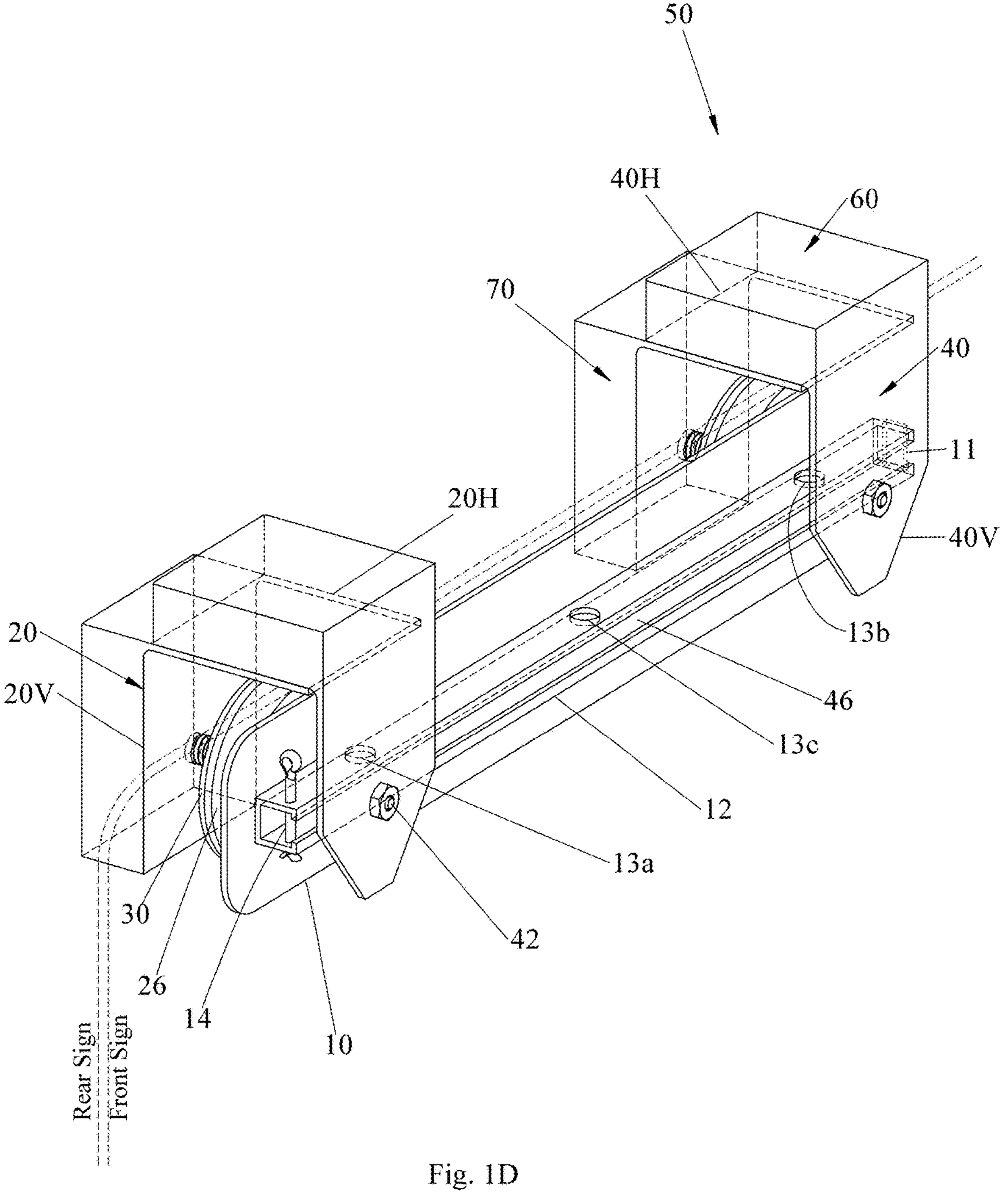
FIG. 1D: Perspective Drawing showing Reference Numbers for another suggested (electronic) embodiment of the ASCC.
Figure 2:
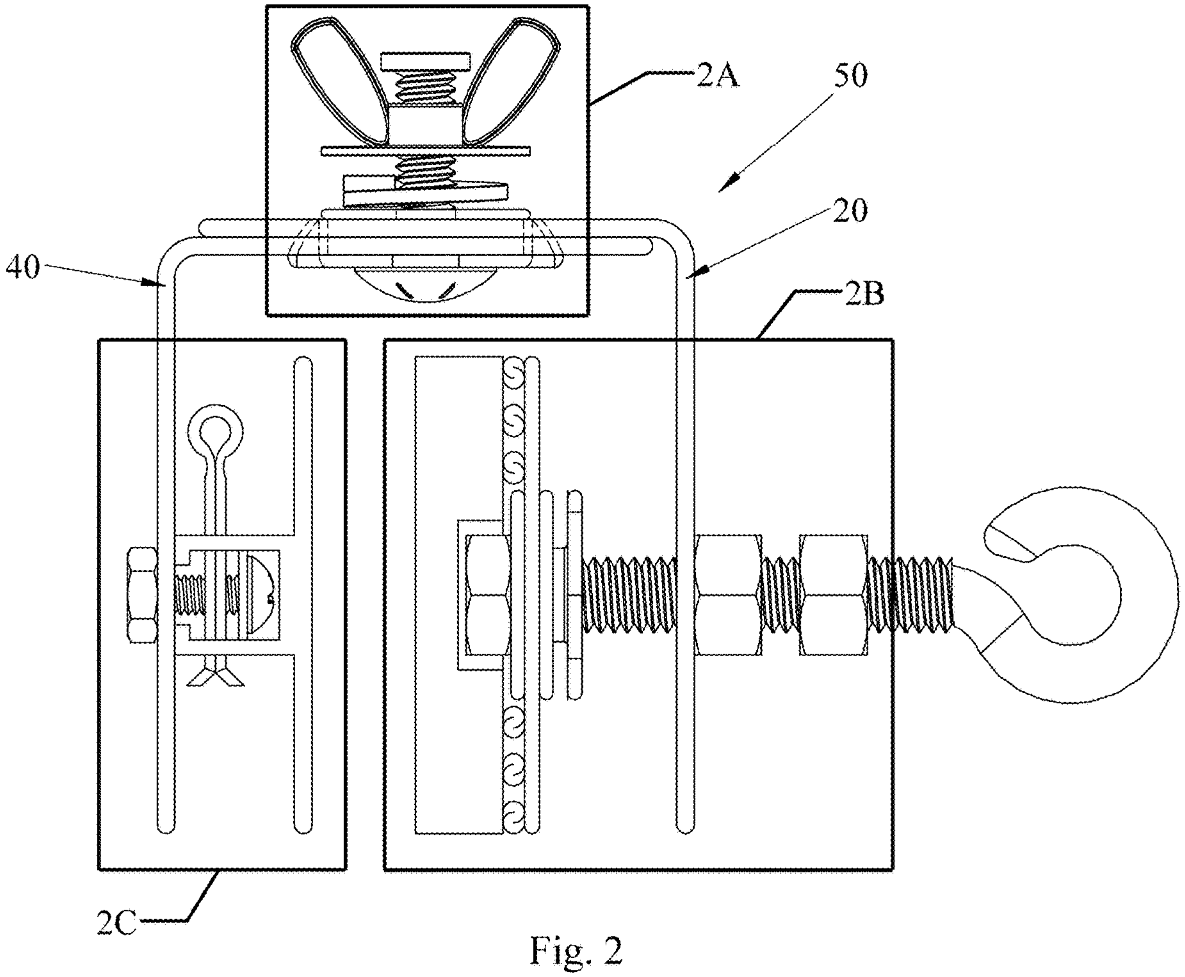
FIG. 2.: End View Drawing of the hook, showing the boundaries for detail drawings FIG. 2A through FIG. 2C.
Figure 2A:
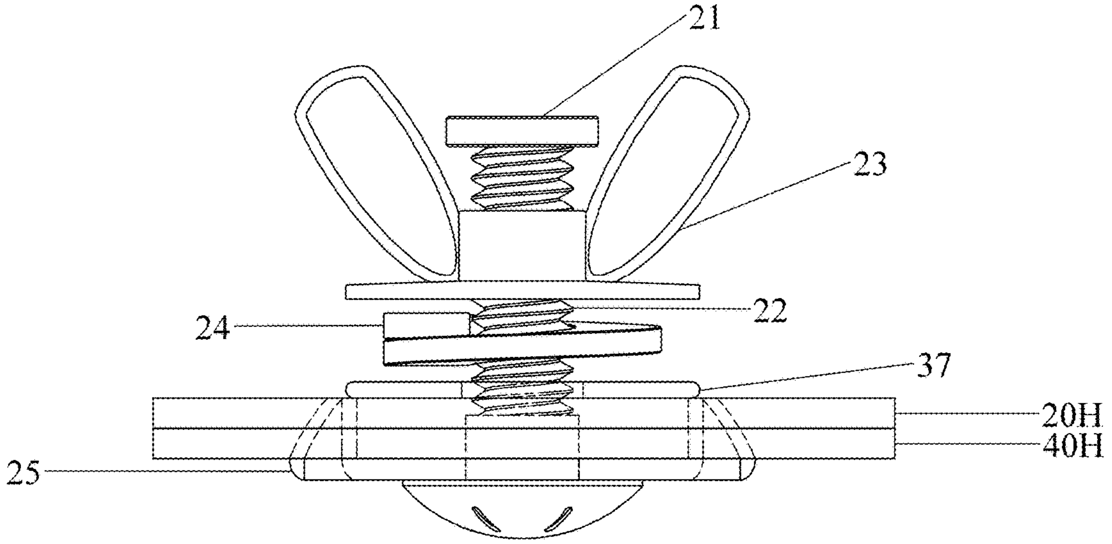
FIG. 2A.: Detail Drawing of the hook expansion mechanism.
Figure 2B:
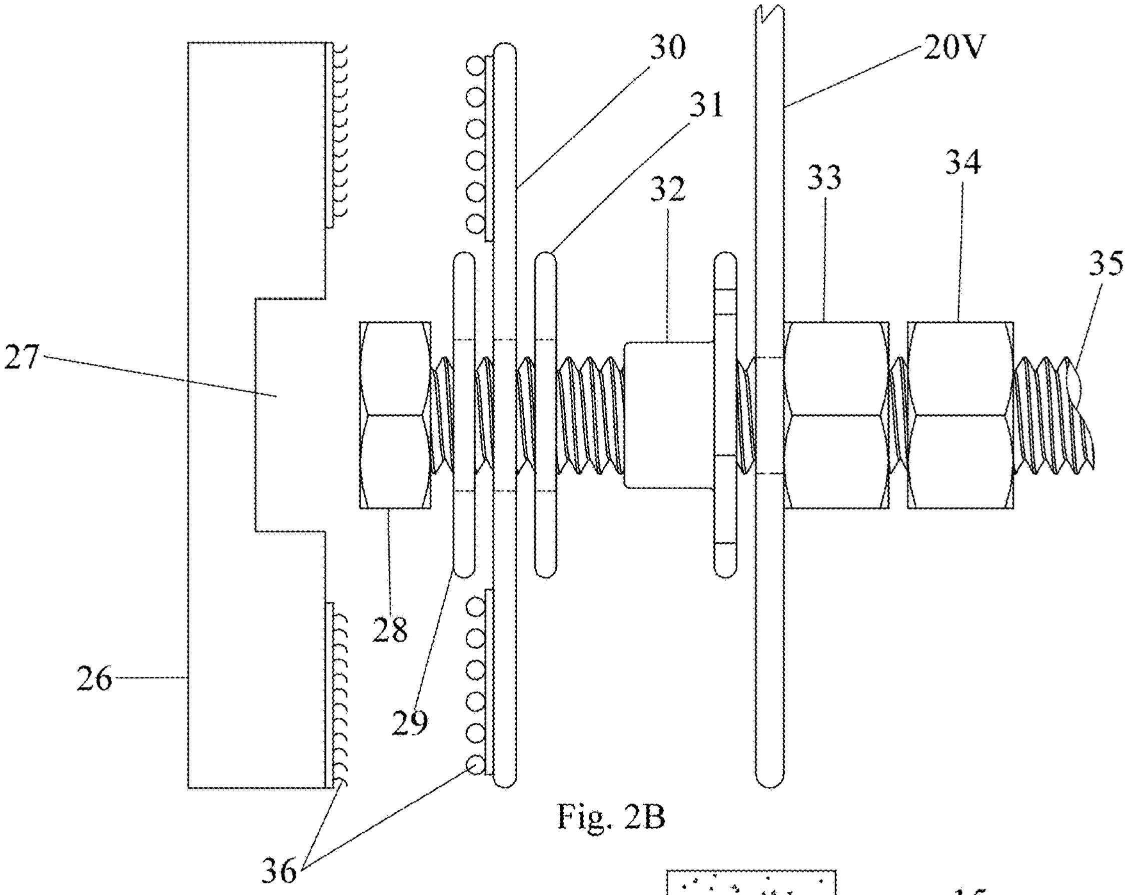
FIG. 2B: Detail Drawing of the eyebolt and clamping mechanism.
Figure 2C:
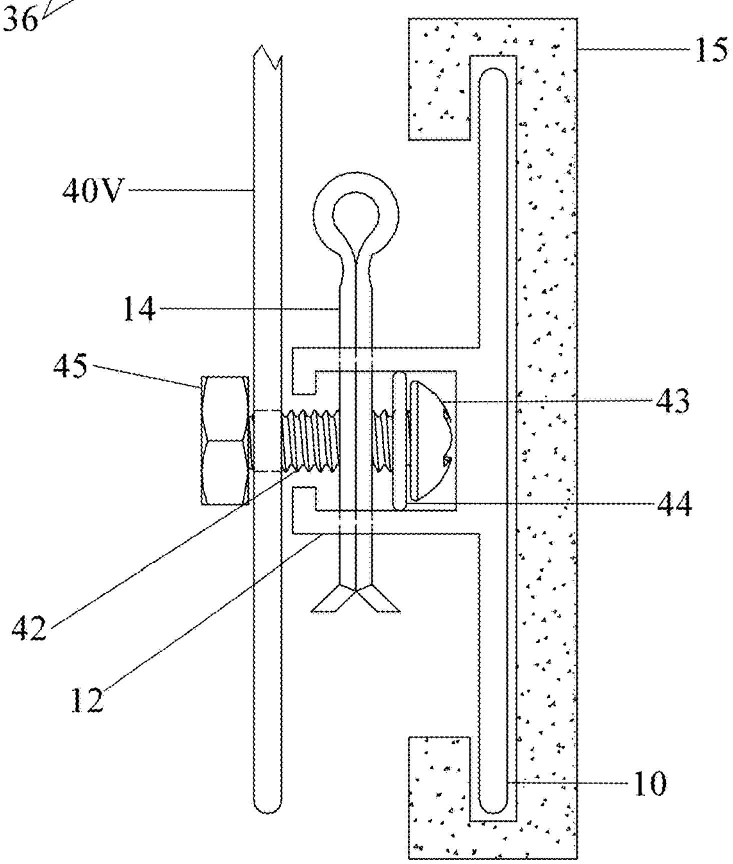
FIG. 2C: Detail Drawing of the rivet attachment to the guide and bar, showing optional protective Silicon sleeve.

The bar [FIGS. 1C, 1D, 2C].

For this embodiment, bar is a flat piece of sheet metal (range of Gauge thickness 15 G to 16 G) about 1.7 mm/0.065 ins thick, 30.5 cm/12 inches long, and 50.8 mm/2 inches wide with four rounded corners (12.7 mm/½-inch-radius Chamfer at each corner).

Other embodiments may be of lengths from 15.2 cm/6 inches to 76.2 cm/30 inches or more depending on its application. It is recommended to increase the metal thickness the longer the bar [10] in order to maintain its rigidity.

Debur all metal surfaces, round off all edges and corners then cover with a protective coating of liquid rubber or plastic by spraying or dipping. This process is recommended for all fabricated metal parts described in this application.

Optionally, the interior surface and edges of bar [10] may be covered with a replaceable protective Silicone rubber C-channel sleeve [15], 6.4 mm/¼ inch thick, of a Shore medium hardness value ranging between A-40 and A-60 as shown in FIG. 2C.

The guide [FIGS. 1C, 1D, 2C, 2D].

Figure 2D:
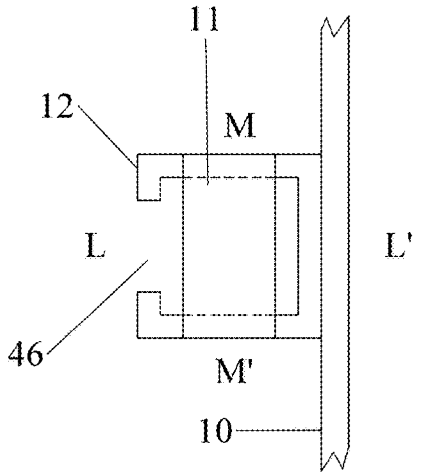
FIG. 2D: Detail Drawing showing the end view of the guide (fixed closed end).

The guide is basically an open-ended metal tube, R inches long, of rectangular cross-section L×M with a slot removed from one wall of the tube forming a channel. The rectangular tube cross-section is defined by the dimensions of its sides L=M=L'=M'=12.7 mm/½ inch (for this embodiment), where side L' opposes L, M' opposes M (FIG. 2D).

R=length of bar minus 25.4 mm/one inch, which is 27.9 cm/11 inches for this embodiment. Centered along the longitudinal centerline of the L surface, remove a 6.4 mm/¼-inch-wide slot to form a channel opening [46] for the full length R of guide [12]. The opposing untouched surface L' will be welded to the exterior surface of bar unless guide and bar have been manufactured as one part.

Label the other two surfaces of the guide, M and M'. Perforate surfaces M and M' along their longitudinal centerlines, by cutting out three circular tie-down holes (TDH) of 9.5 mm/⅜ inch diameter: TDH left [13*a*], TDH right [13*b*], TDH center [13*c*] (FIGS. 1C, 1D). Each TDH has a throughway passage from surface M through surface M'. Locate [13*a*] and [13*b*] 25.4 mm/one inch from each end of guide respectively, and [13C] at the center.

Close off one end of guide [12] by a fixed metal guide stop [11], then align and affix surface L', along longitudinal centerlines with bar [10], such that its surface center point superimposes the surface center point of the exterior surface of bar [10]. Leave the other end open.

Centered 3.2 mm/⅛ inch from the open end, perforate the sides M and M' with a 2.4 mm/3/32-inch diam.—through-hole to accommodate a cotter pin [14] (FIG. 2C).

Each end of guide [12] terminates 12.7 mm/½ inch from the ends of bar [10]. Both bar [10] and guide [12] are aligned in the X axis orientation and together form an integral unit.

Alternatively, guide [12] and bar [10] may be manufactured as one piece by metal forging or by standard 3D printing processes, thereby eliminating the foregoing discussion of the guide [12] as a separate part. FIGS. 2 and 2C show bar [10] and guide [12] as one part.

The hook [50] [FIGS. 1C, 1D, 2].

Fabricate a hook [50] from two pieces (MA1 [20] and MA2 [40]) of 15 G-16 G metal angle, about 1.6 mm-1.8 mm/0.06-0.07 inch in thickness and 50.8 mm/2 inches wide (for this embodiment), each with a short leg and a long leg.

As seen in the end view of hook [50] in FIG. 2, short legs of MA1[20] and MA2 [40] each measures 50.8 mm/2 inches in length, where the short leg of MA1 [20] is SL1 [20H], and the short leg of MA2 [40] is SL2 [40H].

The long leg of MA2 [40] is the front long leg (FL) [40V] and measures 63.5 mm/2.5 inches; the long leg of MA1 [20] is the rear long leg (RL) [20V] measuring (2.5+t) Inches, where t=the metal thickness in inches (which is about 1.7 mm/0.07 inch for this embodiment).

Debur all metal surfaces, and round off all corners and edges of MA1 [20] and MA2 [40], then cover with a protective coating.

Form an inverted U-shaped hook [50] by overlapping the surface of SL1 [20H] over the surface of SL2 [40H] to form one horizontal base with two vertical long legs of equal length.

FL [40V] details (FIG. 2C).

Chamfer the two end corners of the surface of FL [40V], X:Y=3:4. Drill an orthogonal 6.4 mm/¼ inch-diam. hole centered at a point 25.4 mm/one inch up from the bottom (horizontal) edge and along the Y axis centerline (i.e., 25.4 mm/one inch from each vertical edge).

Pass the shank of rivet [42] (4.8 mm/3/16 inch diam., and 12.7 mm/½ inch long) whose factory head (FH) [43] measures 7.9 mm/5/16 inch in diam. through roller [44], which has a 5.6 mm/7/32 inch-inner-diameter center hole and a 9.5 mm/⅜ inch outer diameter, then pass the tall end of rivet [42] through the 6.4 mm/¼ inch-diam hole, so that FH [43] and roller [44] are inside the Interior space of hook [50].

Attach shop head (SH) [45] to the end of rivet [42].

Insert rivet [42], FH [43] and roller [44] through the open end of guide [12] and into the channel opening [46].

With FH [43] and roller [44] deep inside guide [12] and abutting its bottom, adjust SH [45] with about 1.6 mm/1/16 inch clearance away from the surface of FL [40V].

Permanently fix SH [45] to the end of rivet [42], then insert cotter pin [14] into holes at this open end (FIG. 2C).

RL [20V] details (FIG. 2B).

Drill an orthogonal hole 9.5 mm/⅜ inch in diameter through the surface of RL [20V]. Similar to FL [40 V], center this hole 25.4 mm/one inch up from the bottom edge and along the Y axis centerline of RL [20V] surface.

Concentric to this hole, weld a 7.9 mm/5/16-inch-diam. standard nut (Boss Nut or BN) [33] securely to the exterior surface. Screw a 7.9 mm/5/16-inch-diam. standard eyebolt (EB) [35] with threading for a length of 50.8 mm/2 inches into a 7.9 mm/5/16-inch-diam. all-metal, rust resistant prevailing-torque lock nut (e.g. a Grade C Stover Lock Nut—LN) [34] then through BN [33] so that the end of EB [35] passes from the exterior surface through to the interior surface of RL [20V].

To a 25.4 mm/2-inch-diam. circular metal washer (metal disc) [30] with a 12.7 mm/½-inch diam. center hole, permanently attach two 22.2 mm/⅞-inch outer diam. metal washers with 9.5 mm/⅜-inch diam. Inner diam.: CW1[29], and CW2 [31], one on either side of metal disc [30], so that all center holes are concentric with each other, forming a Disc-Washer Assembly (DWA) [29-30-31].

Continue screwing EB [35] into a 7.9 mm/5/16-inch inside diam. T-Nut (e.g. the Hillman Stainless Steel 5/16-18×⅜ Brad Hole) (T-Nut) [32], whose stem has been shortened to fit (as described below), then passing through the DWA [29-30-31], so that the stem of T-nut [32] fits as an axle on which DWA [29-30-31] can freely rotate.

Cut the stem of T-nut [32] a length (S+3.2 mm/⅛ inch), where S=measurement taken at the widest width of the DWA [29-30-31].

Continue to screw EB [35] into a 7.9 mm/5/16-inch-diam. jam nut 2 [28] placed at the very end of EB [35] and flush with it, then permanently attach it.

Permanently attach T-nut [32] in-place on EB [35] so that the end of the cut stem butts against the jam nut 2 [28], and the stem forms an axle for DWA [29-30-31] to freely rotate between the flange of T-nut [32] and the jam nut 2 [28].

From a portion of a high-density polymer material (HDPE) 9.5 mm/⅜ inch thick, cut a 50.8 mm/2 inch-diam. circular pad [26], then remove the center to form a circular recessed cavity (cavity) [27], 15.9 mm/⅝ inch in diam., 4.8 mm/3/16 inch deep.

Affix pad [26] to the Interior surface of metal disc [30], using Industrial Hooks and Loops (Velcro) [36] such that the end of EB [35] along with jam nut 2 [28] are nested inside cavity [27].

Expansion Mechanism details of hook [50] (FIGS. 2, 2A). The overlapped short legs SL1[20H], SL2 [40H] form a hook base 50.8 mm/2 inches wide (in the X axis orientation) by P inches long (in the Z axis orientation), where P varies from a minimum of 50.8 mm/2 inches (for this embodiment) expanding to about 1.5 P or 76.2 mm/3.00 inches in the Z axis orientation; this maximum width expansion can accommodate signs up to about 41 mm/1.6 inches thick.

According to the expansion mechanism design, let P=50.8 mm/2 inches in the Z axis orientation, creating a square horizontal hook base in the X-Z plane of about 10 square cm/4 square inches: From the surface of SL1 [20H], cut and remove a portion to create a rectangular opening 1 [20W] along the Z axis, of dimensions 44.5 mm/1.75 inches long by 7.9 mm/9/32 inch wide centered along the Z axis centerline. Do the same for SL2 [40 H] to create a similar rectangular opening 2 [40W].

Figure 2E:
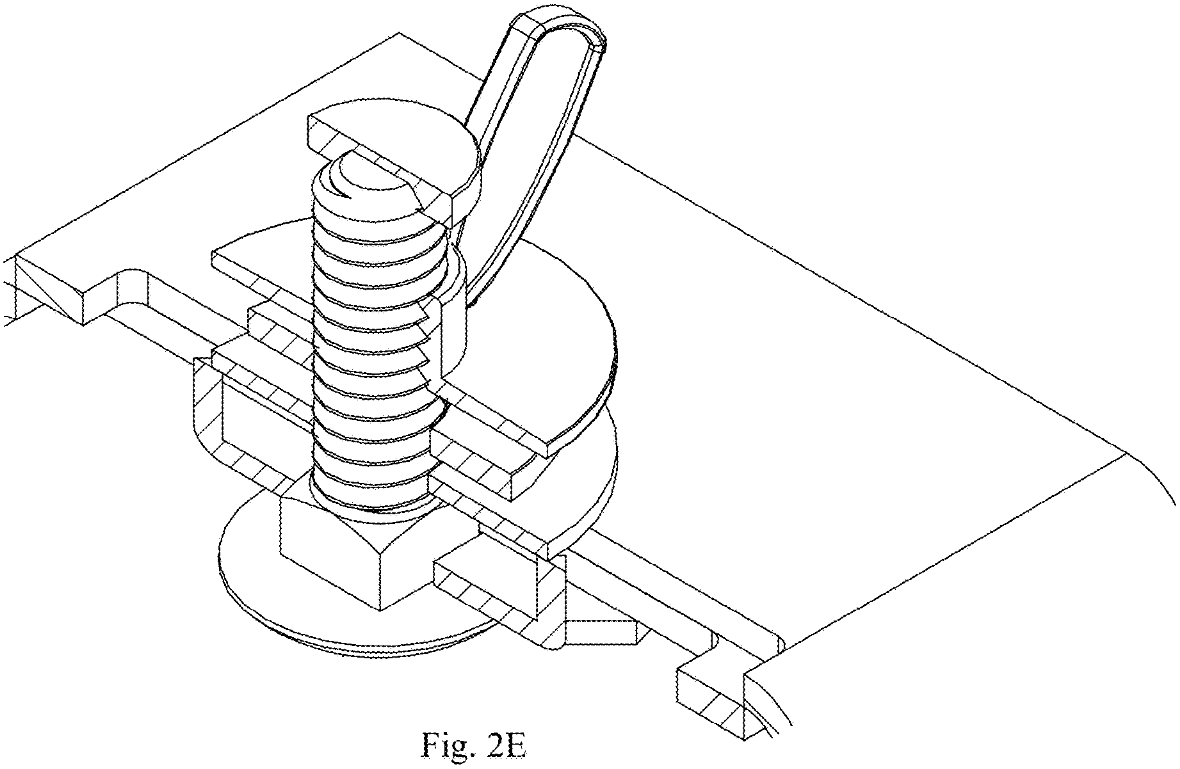
FIG. 2E: Section View Drawing of the expansion mechanism.
Figure 3A:
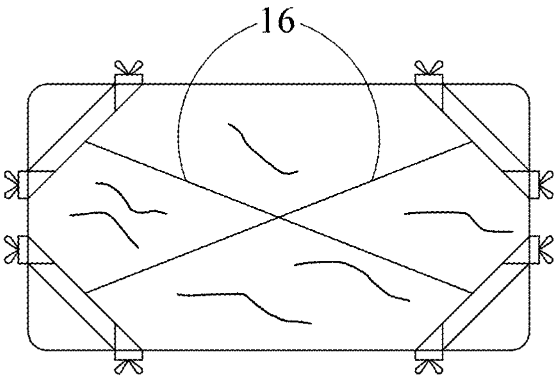
FIG. 3A: Possible configuration of the ASCC on standard MUTCD guide signs (sign fully covered), showing the use of tie-down cords.
Figure 3B:
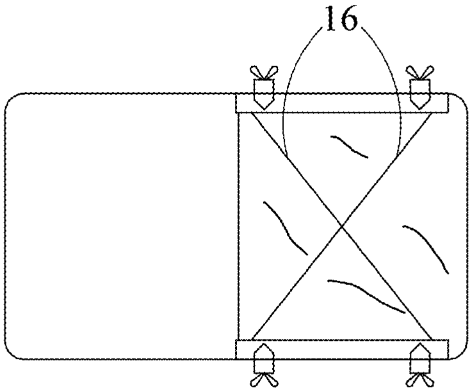
FIG. 3B: Possible configuration of the ASCC on standard MUTCD guide signs (sign partially covered) showing the use of tie-down cords.
Figure 3C:
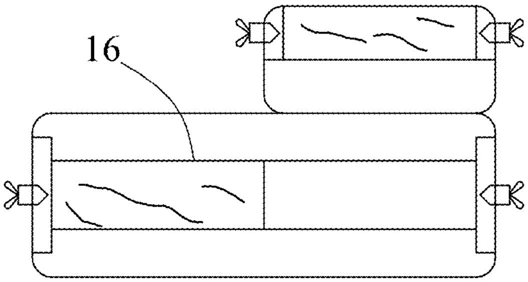
FIG. 3C: Possible configuration of the ASCC on standard MUTCD multiple-array guide signs showing tie-down cords.
Figure 3D:
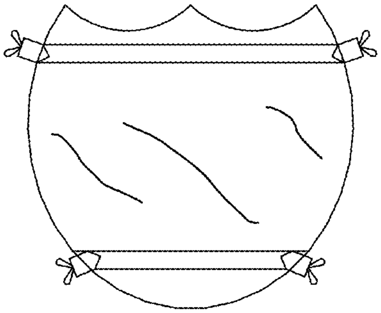
FIG. 3D: Possible configuration of the ASCC on standard MUTCD Interstate Route guide signs.
Figure 3E:
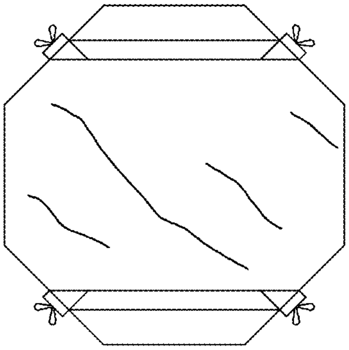
FIG. 3E: Possible configuration of the ASCC on standard MUTCD Stop Signs.
Figure 3F:
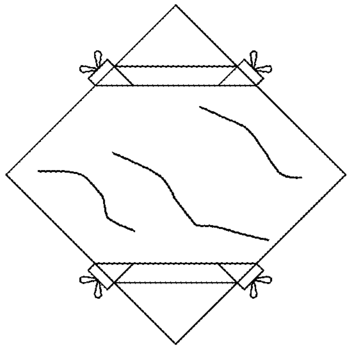
FIG. 3F: Possible configuration of the ASCC on standard MUTCD Warning Signs.

Overlap SL1 [20H] surface OVER SL2 [40H] surface, so that the openings [20W], [40W] align and superimpose (See FIGS. 1C, 2A, 2E).

Pass a 6.4 mm/¼-inch-diam. carriage bolt (CB) [22] through a torque washer [25] (modified by removing two opposing prongs, trimming the other two to fit, and flattening the body).

Continue passing it through the superimposed openings [20W, 40W] from the interior space up through the exterior space, with its head remaining locked in the Interior space, and threads protruding upwards through the exterior surface of hook [50].

From the top (exterior), place a circular metal washer CW3 [37] of 7.9 mm/5/16 inch inner diam. and 22.2 mm/⅞ inch outer diam. over CB [22], then place a lock washer [24] of 7.9 mm/5/16-inch inner diam. and 15.9 mm/⅝ inch outer diam. over CB [22] and on top of CW3 [37]. Screw a 6.4 mm/¼-inch-diam. flanged wing nut [23] on to CB [22].

Screw on and permanently attach a 6.4 mm/¼-inch-diam. jam nut 1 [21] on to the free end of CB [22] (See FIG. 2A).

For this embodiment, all metal parts mentioned are of standard galvanized steel unless otherwise specified. Other commercial materials may also be used to fabricate the ASCC as long as they generally meet or exceed the proposed specifications.

Protect all metal edges, interior and exterior surfaces of hooks [50] and bars [10] by deburring, sanding and rounding off edges and corners then applying an antioxidation protective coating to prevent marring of the underlying sign surfaces and premature corrosion.

The electronic embodiment of the ASCC.

FIG. 1D depicts an electronic embodiment shown by Electronic Control Boxes (ECBX) [60] and ECBC [70]. The operation of the eyebolt [35], the expansion mechanism (FIG. 2A) and movement of hook [50] along guide [12] may be converted from manual to electronic means, and signalized and computerized for remote control applications and monitoring.

Fit the hook [50] with hardware (stepper dc servo motor, gears, shafts and wheels) and software (circuitry, controllers) to turn EB [35], wing nut [23], and rivet [42] to perform all the movements disclosed for the hook [50]. Power by solar-battery power supplies.

ECBX [60] depicts the concept of hardware and software fittings to control the movement of the expansion mechanism, which would vary the width of the hook [50] and turn rivet [42] to move it along guide [12].

ECBC [70] would be a similar concept to electronically control the clamping of pad [26] to the rear surface of a sign, and reactively, the bar [10] to the front surface. The server motor and control circuitry in ECBC [70] would control the turning of EB [35].

Use high-torque NEMA 17 Stepper dc motors that are controlled by wireless communications, and powered by solar-battery systems to turn EB [35], wing nut [23] and rivet [42] to clamp/unclamp, expand/contract the elements of hook [50], and to increase/decrease space between hooks [50] along the guide [12].

Methods of Operations of the ASCC.

In the disclosed embodiments, the ASCC is comprised of two basic metal members: a bar [10], and a variable-width hook [50], of which there are two per unit.

Install a hook [50] by straddling it on any edge of a sign, such that the RL [20V] containing EB [35] and pad [26] rests on the rear surface of the sign, and the bar [10] rests on the front surface and over the covering material.

Although a standard unit of the ASCC in this embodiment requires a minimum of two hooks [50] and one bar [10], a single hook [50] and a bar [10] may also be used successfully, depending on the conditions of use.

The width of hook [50] may be varied to fit signs of different thicknesses up to about 41 mm/1.6 inches (according to this embodiment).

To expand the width of hook [50] adjust the positions of the surfaces of SL1 [20H] and SL2 [40H] relative to each other. Draw SL1 [20H] and SL2 [40H] apart from each other to expand the width to the desired sign dimension, then turn wing nut [23]clockwise to lock that position. Turn it counterclockwise to loosen and reset positions.

Contract the width of [50] by reversing the above procedure.

Use the EB [35] clamping mechanism to clamp hook [50] to the rear of the sign.

Turn EB [35] clockwise to advance the DWA [29,30,31] and pad [26] towards the rear surface of the sign (up to about 41 mm/1.6 inches thick for this embodiment) and clamp on to it, causing bar [10] to reactively grip the front surface of the sign. Avoid over-tightening EB [35], to avoid damaging the sign surfaces.

This interaction of EB [35] and bar [10] creates the clamping action of the ASCC to securely fasten a covering material in-place, providing bar [10] is placed over the covering material, and hook [50] property straddles the edge of the sign, with pad [26] clamping the rear surface of the sign.

Turn EB [35] counterclockwise to loosen the clamping action of hook [50] to release the gripped covering material, thereby facilitating easy removal of the ASCC and the covering material. Prevent EB [35] from unscrewing by tightening LN [34].

The at least one of each pair of EB [35] to the frame at the back of the sign for safety redundancy.

Weld guide [12] to bar [10] (unless they are made as one part) making an Integral unit, allowing a pair of hooks [50], which are connected to it by rivets [42], to swivel and slide freely along its full length.

Rivet [42] is inserted into or removed from guide [12] only via the open end, and is prevented from escaping it by cotter pin [14] and guide stop [11].

The ability of the hooks [50] to swivel and slide allows the ASCC to articulate its member segments around the perimeter of signs of any planar geometry.

Use Tie-down straps [16] to further secure flexible covers by attaching them to the holes provided in the guide [12]. Tie-down holes [13*a*, 13*b*, 13*c*] provide the tie-down points to which carabiners or hooks of tie-down cargo straps may be attached.

Optionally, cover the Interior surface and edges of bar [10] with a replaceable protective Silicone rubber C-channel sleeve, 6.4 mm/¼-inch thick, of medium hardness (Shore value between A-40 and A-60) [15] as shown in FIG. 2C.

Alternatively, guide [12] and bar [10] may be manufactured as one part by metal forging or by standard 3D printing processes, thereby eliminating the foregoing discussion of welding the guide [12] as a separate part.

FIGS. 2 and 2C show bar [10] and guide [12] as one part.

Hook [50] attaches to bar [10] via guide [12].

Insert rivet [42] with FH [43] together with roller [44] into a locking position inside channel opening [46] through the open end of guide [12], enabling hook [50] to freely slide the full length of guide [12]. Insert cotter pin [14] into holes at the open end of guide [12] as shown in (FIG. 2C).

Insert the rivets [42] of two separate hooks [50] in this manner into guide [12]. With this arrangement, each of the two hooks [50] will be able to swivel in-place and slide freely along guide [12] but will not be able to escape from it due to the fixed guide stop [11] at the closed end, and the removable cotter pin [14] at the open end.

The separation distances between a pair of hooks [50] may be varied. Change the separation distance between hooks [50] to fit various sign shapes and dimensions by sliding them along guide [12].

Electronic operations suggested:

Use wireless communication to signal the stepper dc motors fitted on the hook [50] to Independently perform the clamping, expansion or guide travel of each hook [50], record and monitor movements for remote control operations.

The invention claimed is:

1. A portable, articulating, clamping device to secure materials covering the messages advertised on mounted road sign surfaces, comprising:

a) a first and a second inverted U-shaped hooks that are identical to one another, and each with an expandable base, a rear long leg and a front long leg;
b) an expansion mechanism occupying the base;
c) a screwing mechanism occupying the rear long leg that clamps a polymer disc pad to the rear surface of a sign;
d) a metal rivet pin assembly attachment occupying the front long leg;
e) a flat gripping bar with an Integral guide member, to which the rivet pin assembly attaches.

2. The device of claim 1, wherein the hook is comprised of two separate L shaped metal angle pieces of right angular cross section, each with a short leg at right angle with a long leg, and whose corresponding short legs surfaces overlap to form the base of the hook, thus forming an inverted U in ross section, where the base is oriented along the Z axis, and the two long leas are oriented in the Y axis direction with the surface of the rear long leg joined by the base surface to the surface of the front long leg.

3. The device of claim 2, wherein each of the short legs surfaces of the base further comprises a rectangular opening of predetermined dimensions, made along the centerline on the Z axis, and superimposed in the base to accommodate an adequately sized carriage bolt, pushed upward through the opening from the interior space of the base, passing firstly through a modified torque washer, then through the opening, then through a circular washer and a lock washer placed over it from the reverse exterior side; a flanged wing nut screwed on to the carriage bolt, and a jam nut permanently fixed, flush with the end of the carriage bolt.

4. The device of claim 2, wherein the hook further includes in its rear long leg: an eyebolt that Is screwed firstly into a lock nut then into a boss-nut which has been welded to the exterior surface of the rear long leg, and concentrically over a hole of adequate diameter that penetrates through this surface; a T-nut with a flange and a modified shank into which the eyebolt is screwed and liquid welded, this shank forming a close fitting axle to a circular metal disc, to which two circular metal washers of inside diameter also closely fitting over the shank have been welded concentrically to the circular metal disc, one on each side thereof; a jam nut, liquid welded flush to the end of the eyebolt, such that there is ample freedom of rotational motion of the circular metal disc and washers between the flange of the T-nut and the jam nut; a removable circular polymer disc pad with diameter equal to that of the circular metal disc and attached to it by removable means.

5. The device of claim 2, further including a metal rivet pin in its front long leg, comprising a shank, a factory head and a shop head, the shank passing through the center of a circular metal washer as a roller, then through a hole made in the front long leg from interior to exterior, and crowned by the shop head on the exterior, thereby connecting the front long leg to the flat gripping bar which is oriented in the X axis direction.

6. The device of claim 1, wherein the guide is a tube of rectangular cross section, permanently welded to or made as one part with the bar along their longitudinal centerlines, with their surface center points superimposed, and forming an integral unit with it.

7. The device of claim 6 wherein the guide further comprises: a channel opening of predetermined size, created along the longitudinal centerline of its external surface, wide enough to receive the shank of the rivet pin; three adequately dimensioned tie-down holes perforated from the top through to the bottom of the two parallel horizontal walls of the guide, and spaced one at either end, and one in the center; a permanent guide stop welded over the opening at one end of the guide, and a removable cotter pin blocking the opening at the other end.

* * * * *